United States Patent [19]
Williamson, Jr.

[11] 4,300,698
[45] Nov. 17, 1981

[54] MOUNTING MEMBER

[76] Inventor: James H. Williamson, Jr., 170 Linden St., Winnetka, Ill. 60093

[21] Appl. No.: 87,219

[22] Filed: Oct. 22, 1979

[51] Int. Cl.³ .................. B65D 25/10; B65D 25/20
[52] U.S. Cl. .................................. 220/85 R; 220/71; 428/35; 428/137; 248/27.1; 411/427
[58] Field of Search ............... 428/137, 582, 596, 35; 220/DIG. 23, 5 A, 71, 85 R, DIG. 1; 151/41.7; 248/27.1

[56] References Cited

U.S. PATENT DOCUMENTS

| | | | |
|---|---|---|---|
| 2,370,799 | 3/1945 | Kelley | 151/41.7 |
| 3,689,013 | 9/1972 | Neugebauer | 248/27.1 |
| 4,023,257 | 5/1977 | Wright et al. | 264/275 X |

Primary Examiner—George F. Lesmes
Assistant Examiner—Alexander S. Thomas
Attorney, Agent, or Firm—Dressler, Goldsmith, Shore, Sutker & Milnamow, Ltd.

[57] ABSTRACT

A mounting member is provided with an alignment ring and a plurality of outwardly projecting posts unitary therewith. Each post has a threaded bore for receiving a mounting screw. The member is temporarily releasably secured within a mold with the distal ends of the posts displaced inwardly from an adjacent interior surface of the mold and with the openings of the bores directed towards the adjacent interior mold surface. An article is rotationally molded to encapsulate the member with at least the distal end portion of each post embedded in a formed wall of the article.

7 Claims, 6 Drawing Figures

MOUNTING MEMBER

TECHNICAL FIELD

This invention relates to an anchorable metal mounting member and to a method for fabricating an article whereby a molding resin is molded to form a wall with the mounting member embedded as an insert in the wall so that the mounting member can accommodate the attachment of a device to the wall of the article.

BACKGROUND OF THE INVENTION

In an article fabricated from molding resins it is sometimes desired to provide a means for mounting a device to the article. In those applications where the device may impose relatively large forces upon the molded article, it is frequently necessary to provide a suitably strong mounting means in the wall of the article to which the device can be mounted. Further, it is frequently necessary to provide a mounting means in the wall that will effect a leak-tight seal with the mounted device.

Articles molded from molding resins include hollow, single-piece, unitary tanks manufactured from thermoplastic or thermosetting molding resins or compounds. Devices, such as fittings, level sending mechanisms, and the like, may be mounted to the tank and, in some cases, project through the tank wall. Such devices are typically mounted with screws or bolts to the tank wall.

In the past, in certain applications involving vehicle fuel tanks, a mounting structure has been used that includes one or more metal inserts embedded in the tank wall for receiving mounting screws or bolts. Typically, each metal insert is completely embedded in the tank wall except for the opening of threaded bores in the insert structure which communicate with the exterior of the tank for receiving the mounting screws or bolts.

It is important that such metal insert structures be entirely encapsulated on the inside of the tank to prevent leakage of the tank contents. In the past, providing a leak-tight assembly around a metal mounting insert structure has been difficult to achieve. This is especially true in applications where a conventional fuel level sending unit is mounted to a fuel tank that is subject to vibration (e.g., a tank used for gasoline storage on industrial or agricultural equipment or vehicles).

Today, many fuel tanks for agricultural equipment are rotationally molded from a thermally cross-linkable high-density polyethylene resin, such as that resin sold under the trade name Marlex CL-100 by the Phillips Chemical Company. It is especially difficult to provide a leak-proof or leak-tight connection of a fuel level sending unit to an embedded, steel insert structure in the wall of such a fuel tank. Conventional steel mounting structures include those of the type with a generally flat annular ring having threaded bores therein and also include those of the type with an annular ring having projecting bosses uniformly spaced about the ring with a threaded, blind bore in each boss. Embodiments of the latter type of mounting structure are illustrated and described in the U.S. Pat. No. 4,023,257 to Wright et al.

As taught by the prior art, the tank wall is molded around the annular ring portion of the insert so that the entire ring portion is embedded in the wall. In the past, it was thought desirable to completely embed or encapsulate the mounting insert, except for the bore openings to the exterior of the tank. However, conventional rotational molding techniques with the thermally cross-linkable high-density polyethylene resins have not consistently produced leak-tight or leak-proof embedments.

The reasons for the failure of prior art mounting inserts to form a leak-proof embedment are believed to involve one or more parameters, such as the mounting insert shape, the mounting insert material, the molding resin compound, and the molding temperature. Although the reasons why conventional inserts frequently leak are not necessarily fully understood, it is believed that the molding resin does not flow around the mounting insert as completely as desired during the molding process. Cracks or voids are formed which lead from the tank interior to the interface between the molding resin and the insert. The voids can then communicate with the region around the bore openings at the exterior of the tank. This provides leakage paths for the tank contents. Capillary action, of course, can lead to, or add to, leakage through such paths.

It would be desirable to provide a metal mounting insert having a configuration adapted to be encapsulated in a molding resin and having at least portions that are adapted to be embedded in a wall of an article molded from the molding resin for subsequently accommodating the attachment of a device to the wall of the article.

Further, it would be desirable to provide a method for molding an article with the insert securely embedded therein as a leak-tight assembly. Also, it would be beneficial to provide a mounting insert made of a material which, when molded in a wall of an article, would contribute to the reduction or elimination of voids at the interface between the molding resin and the insert.

Also, it would be desirable to provide an insert in which threaded bores could be machined and in which the threaded bores would provide sufficient strength and resistance to stripping when threadingly engaged with fasteners for securing a device to the article wall.

SUMMARY OF THE INVENTION

In the preferred embodiment of the mounting insert or member disclosed herein, the member is fabricated as a sand casting of aluminum (e.g., alloy 319 as listed in Table 1, p, 892, *Metals Handbook*, 8th Edition, American Society for Metals). The insert includes an alignment ring with a generally annular shape and a plurality of posts unitary with the alignment ring. Each post projects outwardly from the ring and defines a threaded bore for receiving a threaded fastener.

According to the preferred form of the method disclosed herein, the insert is positioned within a mold cavity and is temporarily, releasably secured to the mold with the bore openings located adjacent the interior surface of the mold but displaced inwardly, or away, from an interior surface of the mold. If necessary, the bores are initially plugged to prevent flow of the molding resin therein. Preferably, the article is rotationally molded with a thermally cross-linkable high-density polyethylene, such as the product sold under the trade name Marlex CL-100 by Phillips Chemical Company.

During the rotational molding process, the article wall forms around the distal end portion of each post so that the distal end portion of each post is effectively embedded in the article wall. The insert's alignment ring, being displaced further away from the mold interior surface, is not embedded in the formed article wall. However, during the rotational molding process, the alignment ring and portions of the posts that are not embedded in the wall are nevertheless completely encapsulated with the molding material. Subsequently the molding resin is allowed to at least partially solidify and then the article, with the now embedded insert, is released from the mold.

With the structure and method described above, it has been found that a leak-proof or leak-tight assembly is readily and consistently formed. The formation of voids or other leakage paths at the interface between the molding material and the metal insert is virtually eliminated.

The reasons why the leakage paths are virtually eliminated with this structure and method are not necessarily completely understood, and there is no intent herein to be bound by any theory or by any explanation. However, it is believed that the use of certain materials, such as aluminum, instead of the steel compositions used in the prior art structures, permits the mounting structure to rapidly heat up, during the molding process, to a temperature close to that of the molding resin. This prevents localized cooling of the molding resin as it flows in contact with the mounting insert. It is believed that localized cooling can lead to poor or incomplete flow of the molding material around the insert and can contribute to the formation of voids and other leakage paths at the interface between the molding material and mounting structure. If the metal insert has approximately the same temperature as the molding material, this tendency is reduced, if not eliminated altogether.

Further, it is believed that the configuration of the mounting insert—wherein the annular alignment ring is displaced away from the article wall—provides a number of advantages over the prior art inserts in which the entire insert, including any ring configuration, is wholly embedded within the article wall. Specifically, with the novel insert disclosed herein, the problem of encapsulating both the top and bottom of an alignment ring completely within the article wall is totally eliminated. Thus, the article wall can be more easily and consistently molded to a uniform thickness.

Further, the positioning of the alignment ring away from the article wall necessarily removes a large metal mass from within the wall and thus eliminates the large heat sink effect of this metal mass from the critical wall region. Thus, the wall region can be molded without having to design for or otherwise accommodate the effect of a large heat sink in the molding process.

With the preferred embodiment of the insert as formed of sand cast aluminum, it has been found that the bores in the posts may be threaded for receiving mounting screws or bolts of a device to be secured to the tank wall and that the threads in the posts provide a surprisingly strong threaded connection. For typical uses wherein a fuel level sending unit is secured with bolts to the posts in a fuel tank wall, the threaded connections are surprisingly resistant to stripping, even when steel bolts are used. Thus, the novel mounting structure disclosed herein can provide an extremely strong, as well as leak-proof, connection of a device to a wall of an article molded from a molding resin.

Numerous other advantages and features of the present invention will become readily apparent from the following detailed description of the invention and embodiments thereof, from the claims, and from the accompanying drawings.

BRIEF DESCRIPTION OF THE DRAWINGS

In the accompanying drawings forming part of this specification, and in which like numerals are employed to designate like parts throughout the same.

DESCRIPTION OF THE PREFERRED EMBODIMENTS

Figure 1:
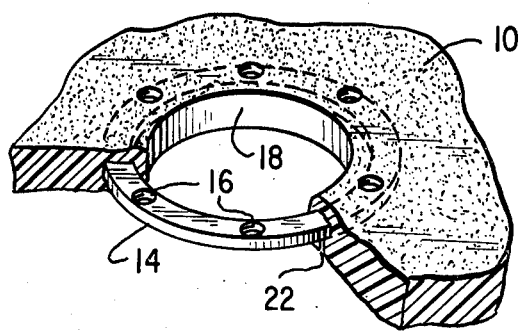
FIG. 1 is a fragmentary, partially broken away perspective view of a wall of a tank molded from a molding resin and having a metal mounting member embedded therein.

This invention may be used in many different forms. There are shown in the drawings and will herein be described in detail preferred embodiments of the invention. It should be understood, however, that the present disclosure is to be considered as an exemplification of the principles of the invention and is not intended to limit the invention to the embodiments illustrated.

The precise shapes and sizes of the components herein described are not essential to the invention unless otherwise indicated, since the invention is described with reference to illustrative embodiments thereof.

It will be understood that references made herein, and in the claims, to various terms such as "metal" and "molding resins" are illustrative. The term "metal" is used herein to include single elements as well as compounds and alloys. The term "molding resin" is used herein to include, among other things, thermoplastic and thermal setting synthetic, hardenable resins.

For ease of description, the mounting member or insert structure will be described in a position in the top horizontal wall of a fuel tank. It will be understood, however, that the mounting member may be manufactured, stored, transported, used, and sold in an orientation other than the position described.

The choice of materials for the fabrication of the mounting member and of the article molded around the mounting member is dependent, in part, upon the particular application involved and upon other variables, as those skilled in the art will appreciate.

The novel mounting member described herein is particularly adapted for being encapsulated with molding resin and for being at least partially embedded in the wall of an article formed from such molding resin. Techniques for molding resins are well known in the art, and the conventional molding process details that are unrelated to the positioning of the mounting member in the mold are unimportant to the present invention.

The novel mounting member disclosed herein is especially well suited for being embedded as an insert in a wall of an article that is rotationally molded from a thermally cross-linkable high-density polyethylene resin powder, such as that sold under the trade name Marlex CL-100 by Phillips Chemical Company.

Rotational molding techniques are well known in the art and the rotational molding process details that are unrelated to the positioning of the mounting member in the mold are unimportant to the present invention. In general, rotational molding techniques are disclosed in the aforementioned U.S. Pat. No. 4,023,257 and in *Plastics Engineering Handbook of the Society of the Plastics Industry, Inc.*, ed., Joel Frados, Van Nostrand Reinhold Ltd., (New York, New York, 1976), pp. 348 et seq.

FIG. 1 illustrates the wall 10 of a hollow article, such as a fuel tank, molded about a ring-like mounting member or insert 14 so that the mounting member 14 is entirely embedded within the wall 10. The prior art mounting member 14 is made of steel and has bores 16 equally spaced around the member. Each bore 16 extends completely through the member and is internally threaded to receive a screw or bolt. The wall 10 may be molded with an internal aperture 18 having a generally cylindrical configuration concentric with the ring mounting member 14. Alternatively, the wall 10 may be first molded without an aperture and the aperture 18 may be subsequently drilled or cut into the wall 10.

The bores 16 are typically plugged during the molding process so that they are exposed, at one end, to the exterior surface of the wall 10. It is to be noted that the wall 10 completely surrounds the ring-like mounting member 14, except for the regions directly over each bore 16.

A fitting or device, such as a fuel level sending unit (not illustrated), may be mounted to the wall 10 by means of bolts or screws threadingly engaged with the bores 16. If a conventional fuel level sending unit is thus mounted, a portion of the unit is received within the aperture 18 and projects through the wall 10 to the interior of the tank.

In those situations where the mounting ring 14 is embedded within a wall 10 of a fuel tank, the fuel tank is typically fabricated as a one-piece, hollow tank by means of conventional rotational molding techniques generally described in the U.S. Pat. No. 4,023,257 and in the *Plastics Engineering Handbook of the Society of Plastics Industry, Inc.* cited above.

To fabricate the assembly illustrated in FIG. 1, the ring mounting member 14 can be first bolted or otherwise releasably attached to the interior cavity walls of a conventional rotational mold prior to charging the mold cavity with the molding resin. To this end, bolts may be secured through the mold wall to the bores 16. The mounting bolts are positioned in relation to the mold wall so that the mounting ring 14 is spaced inwardly of the interior surface of the mold to permit the desired thickness of the molding material to be molded between the mounting member 14 and the interior surface of the mold.

Following the proper positioning and securement of the mounting member 14 inside the mold, the mold cavity is charged with the molding resin or material and the conventional rotational molding sequence is effected to form the wall 10 on the interior surface of the mold cavity and to thereby embed the mounting member 14 within the formed wall 10.

Where mounting members of the type illustrated in FIG. 1 are used to mount fuel level sending units in fuel tanks that have been rotationally molded from a thermally cross-linkable high-density polyethylene resin, it has been found that the encapsulation of the mounting members are not always entirely leak-proof or leak-tight. In fact, cracks or voids, such as at 22, frequently form in the wall 10 during the molding process and provide a leakage path from the interior of the tank through the wall to the wall/insert interface. The fuel tank contents, such as gasoline, flows because of, or with the aid of, capillary action through the void 22 and along the interface between the wall 10 and the mounting member 14 to the bores 16 from which the fuel then leaks to the exterior of the tank.

Although not completely understood, it is believed that the voids 22 form for a number of reasons. First, it is believed that the molding of the wall 10 completely around the annular ring mounting member structure cannot be effectively accomplished because the mounting member 14 physically impedes the flow of molding resin around the member. Also, because the thickness of that portion of the wall defined between the wall surface and the mounting member 14 is relatively thin. Thus, the flow of molding resin between the interior surface of the mold cavity and the mounting member 14 is restricted. This barrier to the flow of the molding resin can prevent effective leak-tight encapsulation of the mounting member.

In addition, since the ring-like mounting member 14 presents a structural mass of steel embedded entirely within the wall 10, it acts as a heat sink and causes a localized cooling of the flowing molding resin as the resin comes in contact with the mounting member. The premature, localized cooling is undesirable and is thought to lead to the formation of cracks and voids and otherwise contribute to insufficient encapsulation of the ring-like member. Other types of prior art steel mounting inserts having ring-like structures entirely embedded in the wall of the molded tank are also believed to suffer these effects and the resulting tendency to leak.

The exact mechanisms by which voids are formed and the exact mechanisms which account for the poor encapsulation of the mounting member may not be completely understood and there is no intent herein to be bound by any theory or by any explanation as provided above.

Figure 2:
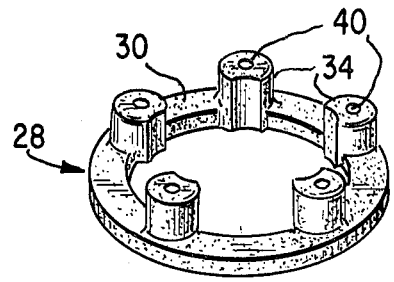
FIG. 2 is a perspective view of the top of the novel mounting member described herein.

In order to overcome the above-discussed leakage problems associated with certain mounting member structures known to the prior art, a novel mounting member 28 is provided as illustrated in FIG. 2. The mounting member 28 is preferably sand cast from aluminum (e.g., alloy 319 as listed in Table 1, p. 892, *Metals Handbook*, 8th Edition, American Society for Metals), through other metals or alloys, including brass or zinc, may be used in some applications. Also, in some applications, the mounting member may be fabricated with permanent molding techniques or with die casting techniques.

The member 28 has a generally annular alignment ring 30, the exterior and interior periphery of which each define a generally cylindrical surface, and has a plurality of posts 34 unitary with the alignment ring 30. Each post projects upwardly or outwardly from the ring 30 and defines a threaded blind bore 40 for receiving a threaded fastener. Of course, the bore 40 is typically threaded by conventional means after the mounting member 28 has been sand cast.

The alignment ring 30 functions to connect the mounting posts 34 in a predetermined array as a one-piece, unitary assembly. This offers an advantage over prior art mounting members that require welding or other securing techniques to provide mounting screw receiving posts in a predetermined array. Further, this has an obvious advantage over other types of prior art structures in which a separate, individual mounting member is associated with each mounting screw and wherein each separate mounting member must be individually retained in place within a mold during the molding process. The use of a single, unitary member 28 eliminates handling of multiple parts and reduces the time required for placement in the mold.

Figure 3:
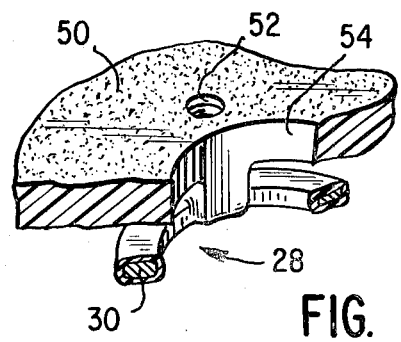
FIG. 3 is a fragmentary, partially broken away perspective view of the mounting member of FIG. 2 as fabricated in a tank molded from a molding resin and showing portions of the mounting member embedded in the tank wall with unembedded portions of the mounting member encapsulated by the molding resin.

The mounting member 28 is particularly well suited for being embedded as an insert in the wall of an article molded from a molded resin, especially from a thermally cross-linkable high-density polyethylene resin powder such as that sold under the trade name Marlex CL-100 by Phillips Chemical Company. As illustrated best in FIG. 3, the mounting member 28 is preferably embedded in the molded wall 50 of an article, such as a fuel tank, with the alignment ring 30 disposed outwardly from the wall 50. Only the distal end portions of the posts 34 are embedded within the wall 50. The wall 50 is molded with apertures 52 in the regions over the post bores 40 to provide access thereto so that mounting screws or bolts may be threadingly engaged with the posts 34. As can be seen in FIG. 3, the entire mounting member 28 is encapsulated with the molding resin so that leakage from the interior tank is effectively prevented.

A central aperture 54 may be molded in the article wall 50 concentric with the mounting member 28 or may be subsequently drilled or cut into the wall after molding.

Preferably, the alignment ring 30 is displaced away from the wall 50 so as not to interfere with the formation of the wall 50 during the molding process. The alignment ring is spaced from the article wall so that spaces are defined between the alignment ring and the wall between the posts. Thus, during the molding sequence, the flow of molding resin is not blocked or impeded by the alignment ring 30. This is in contrast with prior art mounting members, such as that illustrated in FIG. 1, where the ring-like structure is embedded entirely within the wall of the molded article and necessarily acts as a barrier to impede the flow of molding resin during the formation of the wall.

According to one form of the method, the novel mounting member is preferably embedded in an article by means of molding the article from a thermally cross-linkable high-density polyethylene resin powder, such as that sold under the trade name Marlex CL-100 by Phillips Chemical Company, with conventional rotational molding techniques. The method specifically includes positioning the mounting member in a mold cavity within a mold and temporarily releasably securing the mounting member to the mold. The mounting member is positioned in the mold so that the distal ends of the posts and bore openings are displaced inwardly from the interior surface of the mold. The member 28 is oriented so that the alignment ring portion 30 is positioned further from the interior mold surface than the distal ends of the posts 34. Typically, the mounting member is secured within the mold by means of bolts or screws passing through the mold wall and threadingly engaged with the post bores. Those bores, if any, that are not bolted to the mold are plugged, as with suitable screws or unthreaded plugs, to prevent flow of the molding resin therein during the molding process.

To mold the article, the mold is charged in the conventional manner with the thermally cross-linkable high-density polyethylene resin powder and the rotational molding sequence is initiated. During the rotational molding, the mounting member is preferably encapsulated with at least the distal end portion of each post embedded in a formed wall of the article and with the alignment ring displaced away from the formed article wall.

After the article has been molded, the molded resin is permitted to at least partially solidify and the formed article, with the embedded mounting member therein, is then removed from the mold. To this end, the releasably secured mounting screws are threadingly disengaged from the mounting member bores. Also, any plugs that had been threadingly engaged with the bores to prevent flow of the molding resin into the bores would be removed.

The rotational mold used in the manner described above may include a solid, generally cylindrical, inwardly projecting mold portion about which the mounting member could be concentrically disposed to permit molding of the article with an opening in the article wall to provide access through the mounting member. This would provide an access aperture similar to the access aperture 54 illustrated for the article wall 50 in FIG. 3, and can be generally of the type shown in U.S. Pat. No. 4,023,257. Alternatively, the article wall could be molded without such a central aperture and the aperture could be subsequently drilled or otherwise machined into the article at the appropriate location.

Fuel tanks are typical of articles molded in this manner, and a resulting molded fuel tank structure would be that illustrated in FIG. 3. It is to be noted that the alignment ring, though preferably displaced away from the tank wall, is, in any case, entirely encapsulated with the molding resin.

Figure 4:
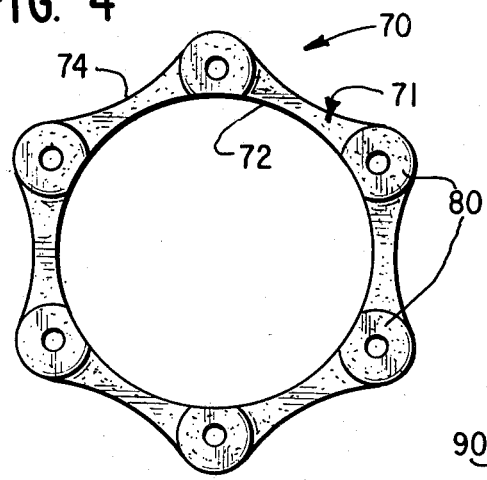
FIG. 4 is a top plan view of another embodiment of the novel mounting member illustrated in FIG. 2.
Figure 5:
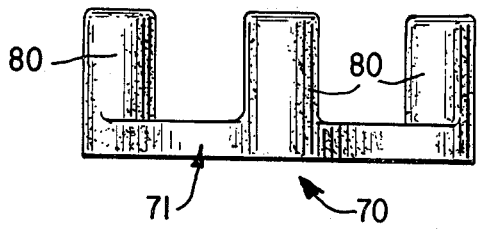
FIG. 5 is an elevational view of the embodiment of the mounting member illustrated in FIG. 4.

Another embodiment of the mounting member is illustrated in FIGS. 4 and 5 and is designated generally therein by numeral 70. In contrast with the embodiment illustrated in FIG. 2, the embodiment 70 in FIGS. 4 and 5 has an alignment ring 71 with a generally cylindrical inner surface 72 and has scalloped, concave exterior surface regions 74. Posts 80 are integrally formed as a unitary part of the alignment ring 71 and function in the same manner as the posts 34 illustrated for the embodiment in FIG. 2. This form of the mounting ring is particularly well suited for those applications in fuel tanks wherein the circular cylindrical surface 72, after encapsulation, is intended to function as a restraining guide for an inwardly projecting portion of a device to be mounted to the fuel tank.

Figure 6:
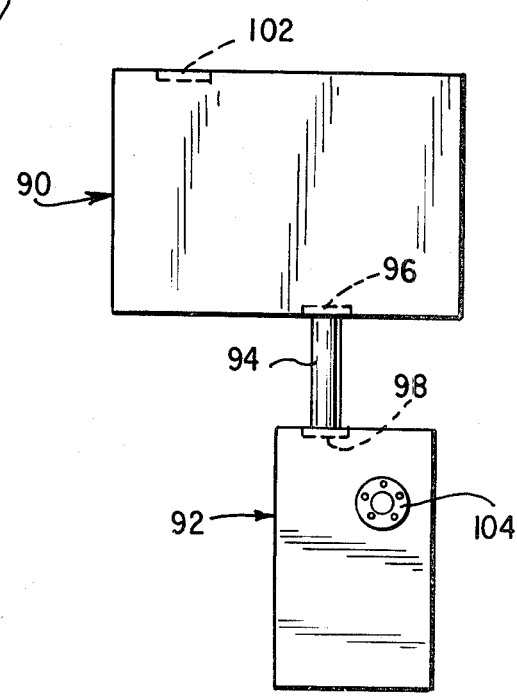
FIG. 6 is a simplified schematic diagram showing the location of four mounting members in two fuel tanks molded from a molding resin and connected with a conduit.

FIG. 6 schematically illustrates a novel assembly of two tanks, upper tank 90 and lower tank 92, which are adapted to hold fuel in agricultural equipment or vehicles. The tanks 90 and 92 are connected with a flexible conduit 94. The conduit 94 may be connected with appropriate fittings (not illustrated) to the tanks by means of the novel mounting members disclosed herein (e.g., member 70 in FIG. 4) and which are schematically illustrated in dashed line in FIG. 6 at 96 and 98. Additionally, fuel level sending units may be mounted to each tank with the novel mounting member as designated generally at 102 for tank 90 in FIG. 6 and at 104 for tank 92 in FIG. 6.

The novel mounting member disclosed herein may also be made in relatively large diameters for use as a leak-proof seal mounting around large openings in articles, such as filler neck openings in fertilizer tanks. Rotationally molded fertilizer tanks are presently made in capacities from 25 to 1400 gallons. The novel mounting member disclosed herein, if provided in a nominal size of 20 inches in diameter, could be used in the filler necks of the largest of these tanks. Also, the novel mounting member disclosed herein may be used at agitator rod openings and at the spray tube manifold connection.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

It is claimed:

1. An integral assembly of a tank and a mounting member adapted for subsequently accommodating the attachment of a device to the mounting member on the tank wall, said assembly comprising:
   a molding resin molded as a wall defining an interior volume to form the tank; and
   a mounting member carried by said tank wall, said member comprising a metal alignment ring having a generally annular configuration and comprising a plurality of posts unitary with said alignment ring, each said post projecting outwardly from said alignment ring and into said wall, each said post defining a threaded bore for receiving a threaded fastener, said tank wall being molded with portions of said posts embedded in said tank wall with the distal ends of said posts communicating with the tank exterior for permitting access to said threaded bores for receiving threaded fasteners for mounting said device to said tank wall, said alignment ring being spaced away from said tank wall on the interior of said tank and defining spaces between said alignment ring and said tank wall between adjacent posts, all of the surfaces of said mounting member that project from said tank wall on the interior of said tank being encapsulated within said molding resin.

2. The assembly in accordance with claim 1 in which each said post defines a blind bore.

3. The assembly in accordance with claim 1 in which said metal is one of the group of metals consisting of aluminum, bronze, and zinc.

4. The assembly in accordance with claim 1 in which said metal is sand cast aluminum.

5. The assembly in accordance with claim 1 in which said alignment ring is defined on the exterior periphery thereof by a generally cylindrical surface.

6. The assembly in accordance with claim 1 in which said alignment ring is defined in part by a generally cylindrical surface on the interior of said ring.

7. The assembly in accordance with claim 1 in which said mounting member is an aluminum 319 sand casting.

* * * * *